US010554896B2

(12) United States Patent
Birkler

(10) Patent No.: US 10,554,896 B2
(45) Date of Patent: Feb. 4, 2020

(54) STEREOSCOPIC IMAGING USING MOBILE COMPUTING DEVICES HAVING FRONT-FACING AND REAR-FACING CAMERAS

(71) Applicant: InsideMaps Inc., Los Altos, CA (US)

(72) Inventor: Paul Joergen Birkler, Foster City, CA (US)

(73) Assignee: Insidemaps, Inc., Los Altos, CA (US)

( * ) Notice: Subject to any disclaimer, the term of this patent is extended or adjusted under 35 U.S.C. 154(b) by 232 days.

(21) Appl. No.: 15/497,620

(22) Filed: Apr. 26, 2017

(65) Prior Publication Data

US 2017/0324941 A1 Nov. 9, 2017

Related U.S. Application Data

(60) Provisional application No. 62/331,582, filed on May 4, 2016.

(51) Int. Cl.
*H04N 13/00* (2018.01)
*H04N 5/232* (2006.01)
*H04N 13/296* (2018.01)

(52) U.S. Cl.
CPC ....... *H04N 5/23296* (2013.01); *H04N 13/296* (2018.05)

(58) Field of Classification Search
CPC ............. H04N 5/2258; H04N 5/23238; H04N 13/239; H04N 7/181; G06T 2200/04; G06T 2207/10012

(Continued)

(56) References Cited

U.S. PATENT DOCUMENTS 5,883,695 A 3/1999 Paul
8,780,180 B2 7/2014 Parulski
(Continued)

OTHER PUBLICATIONS

Xiaoming Deng, Fuchao Wu, Yihong Wu and Chongwei Wan, "Automatic spherical panorama generation with two fisheye images," 2008 7th World Congress on Intelligent Control and Automation, Chongqing, 2008, pp. 5955-5959. (Year: 2008).*
(Continued)

*Primary Examiner* — Sath V Perungavoor
*Assistant Examiner* — Daniel Chang
(74) *Attorney, Agent, or Firm* — Vierra Magen Marcus LLP

(57) ABSTRACT

Stereoscopic imaging is performed using a mobile computing device having front- and rear-facing cameras and mounted on a rotational mechanism. The cameras and rotational mechanism are controlled, e.g., by a downloaded application, to capture images of a room or other environment using both the front- and rear-facing cameras at different pan angle and tilt angle combinations. First and second images of a portion of the room or other environment, captured using the front- and rear-facing cameras, are selected for inclusion in a stereo image pair. Obtained images and corresponding metadata are transferred to a remote system. A structure from motion pipeline is used to generate a three-dimensional model of the room or other environment. Data that enables the mobile computing device to display a three-dimensional model of the room or other environment is received from the remote system and used to display the three-dimensional model.

21 Claims, 10 Drawing Sheets

(58) Field of Classification Search
USPC .............................................. 348/36, 47, 38
See application file for complete search history.

(56) References Cited

U.S. PATENT DOCUMENTS

| | | | |
|---|---|---|---|
| 2010/0098328 A1* | 4/2010 | Se | G01C 11/06 382/154 |
| 2012/0162366 A1* | 6/2012 | Ninan | H04N 5/2355 348/43 |
| 2013/0229569 A1 | 9/2013 | Bevirt et al. | |
| 2014/0240454 A1* | 8/2014 | Hirata | H04N 5/23232 348/38 |
| 2014/0300693 A1* | 10/2014 | Hirata | H04N 5/23216 348/39 |
| 2014/0313289 A1* | 10/2014 | Kim | H04N 21/2362 348/43 |
| 2015/0103146 A1* | 4/2015 | Rose | H04N 13/239 348/47 |
| 2015/0116509 A1* | 4/2015 | Birkler | H04N 5/23293 348/207.1 |
| 2015/0229849 A1* | 8/2015 | Shin | H04N 1/00307 348/207.1 |
| 2016/0012283 A1 | 1/2016 | Mitoma et al. | |

OTHER PUBLICATIONS

Y. Bastanlar, Structure-from-Motion for Systems with Perspective and Omnidirectional Cameras, Ph.D. Thesis, Middle East Technical University, 2009. (Year: 2009).*

* cited by examiner

STEREOSCOPIC IMAGING USING MOBILE COMPUTING DEVICES HAVING FRONT-FACING AND REAR-FACING CAMERAS

PRIORITY CLAIM

This application claims priority to U.S. Provisional Patent Application No. 62/331,582, filed May 4, 2016, which is incorporated herein by reference.

BACKGROUND

It is often useful to have a schematic, blue print or other model of rooms of a building when either moving furniture, buying new furniture, buying carpets or rugs, remodeling, repainting or otherwise modifying characteristic of rooms or elements therein. Various products exist, which are supposed to assist users in producing such models. Some such products, which are implemented using software, typically require that a user spend a large amount of time taking manual measurements of rooms and items therein and then manually entering such measurements into a computing device to enable the software running on computing device to generate models based on the manually entered information. More recently, special cameras have been developed that remove some of the manual procedure previously necessary, but such cameras typically costs thousands of dollars, and thus, are not readily available to most people. For example, some cameras perform three-dimensional (3D) scanning using structured light or time-of-flight (TOF) sensors to recreate a 3D structure on point clouds. Another technique is to use a stereo camera rig that includes multiple cameras, or at least multiple camera sensors, that simultaneously obtain a pair of images from two different perspectives by spacing the multiple cameras or camera sensors apart from one another. Such specialized cameras are very complex and expensive and are not owned by or accessible to most people. By contrast, most people either own or have access to a smartphone, tablet or other mobile computing device. However, over ninety-nine percent of smartphones, tablets and other mobile computing devices are not capable of performing 3D scanning using structured light and do not include a stereo camera configuration.

DETAILED DESCRIPTION

In general, embodiments of the present technology enable three-dimensional (3D) models of rooms or other environments to be generated quickly and efficiently using images obtained using a mobile computing device. Such 3D models can be generated based on images using structure from motion (SfM) software. Certain embodiments of the present technology are related to the techniques for obtaining the appropriate images that can be used by SfM software to generate the 3D models. Further, certain embodiments of the present technology are used to obtain metadata corresponding to the obtained images, wherein the metadata enables the SfM software to generate 3D models more efficiently and quickly than has previously been possible. Advantageously, embodiments of the present technology enable such images and corresponding metadata to be obtained using mobile computing devices that many (if not most) people that may be interested in 3D models of rooms or other environments already own.

Figure 1:
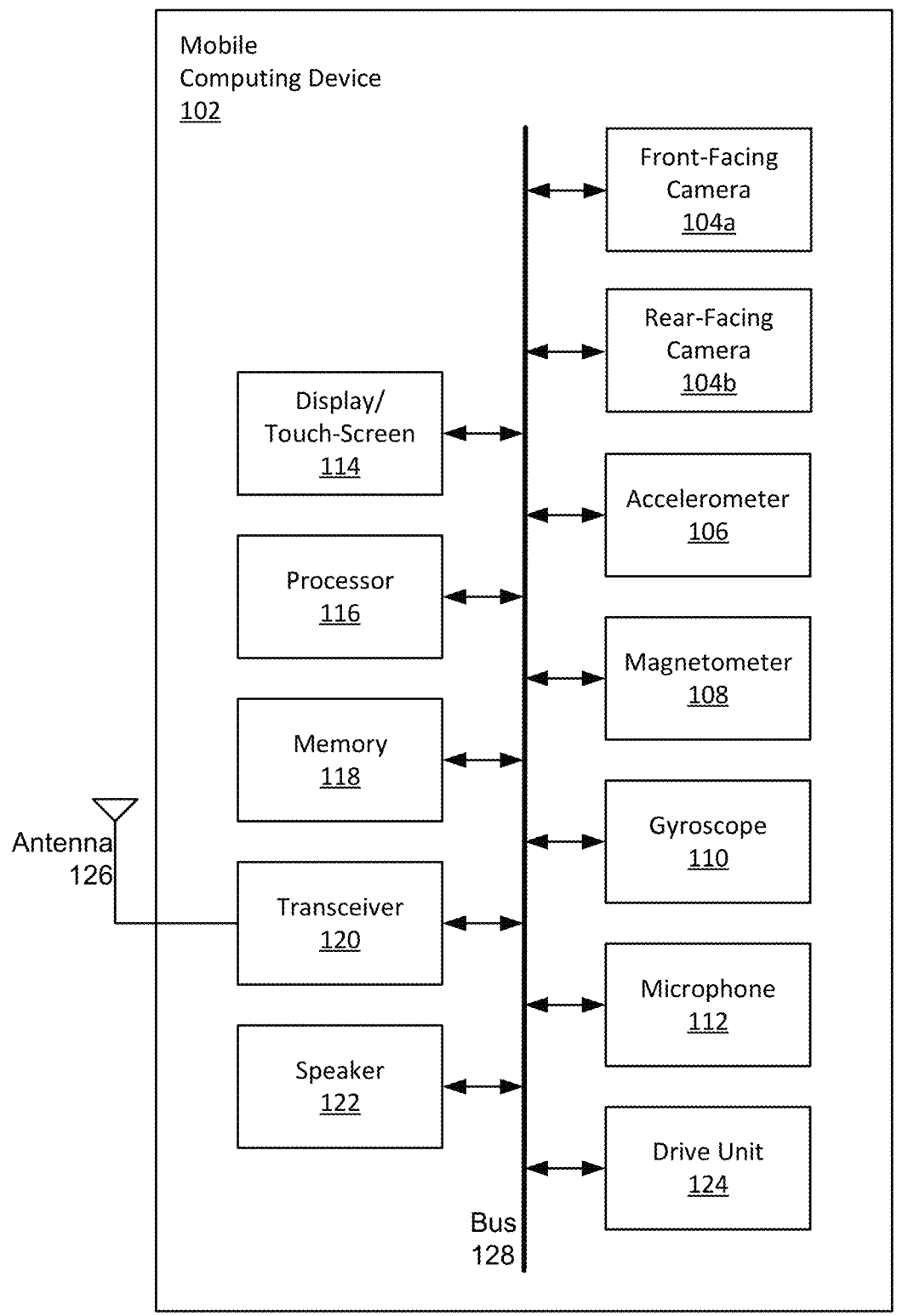
FIG. 1 illustrates an exemplary components of a mobile computing device with which embodiments of the present technology can be used.

FIG. 1 illustrates an exemplary mobile computing device 102 with which embodiments of the present technology described herein can be used. The mobile computing device 102 can be a smartphone, such as, but not limited to, an iPhone™, a Blackberry™, an Andriod™-based or a Windows™-based smartphone. The mobile computing device 102 can alternatively be a tablet computing device, such as, but not limited to, an iPad™, an Andriod™-based or a Windows™-based tablet. For another example, the mobile computing device 102 can be iPod Touch™, or more generally, any other mobile computing device that includes front- and rear-facing cameras capable of capturing monocular digital images.

Referring to the block diagram of FIG. 1, the mobile computing device 102 is shown as including a front-facing camera 104a, a rear-facing camera 104b, an accelerometer 106, a magnetometer 108, a gyroscope 110, a microphone 112, a display 114 (which may or may not be a touch screen display), a processor 116, memory 118, a transceiver 120, a speaker 122 and a drive unit 124. Each of these elements is shown as being connected to a bus 128, which enables the various components to communicate with one another and transfer data from one element to another. It is also possible that some of the elements can communicate with one another without using the bus 128.

The front of the mobile computing device 102 is the major side of the device on which the display 114 (which may or may not be a touch screen display) is located, and the back of the mobile computing device 102 is the other or opposite major side. The rear-facing camera 104b is located on the back of the mobile computing device 102. The front-facing camera 142a is located on the front of the mobile computing device 102. The front-facing camera 104a can be used to obtain images or video, typically of the person holding the mobile computing device 102. The rear-facing camera 104b can be used to obtain images or video, typically of a scene and/or of a person other than the person holding the mobile computing device 102.

The accelerometer 106 can be used to measure linear acceleration relative to a frame of reference, and thus, can be used to detect motion of the mobile computing device 102 as well as to detect an angle of the mobile device 102 relative to the horizon or ground. The magnetometer 108 can be used as a compass to determine a direction of magnetic north and bearings relative to magnetic north. The gyroscope 110 can be used to detect both vertical and horizontal orientation of the mobile computing device 102, and together with the accelerometer 106 and magnetometer 108 can be used to obtain very accurate information about the orientation of the mobile computing device 102. The microphone 112 can be used to detect voice commands for controlling the mobile computing device 102, as well as for enabling the mobile computing device 102 to operate as a mobile phone, e.g., if the mobile computing device 102 is a smartphone. It is also possible that the mobile computing device 102 includes additional sensor elements, such as, but not limited to, an ambient light sensor and/or a proximity sensor.

The display 114, which many or not be a touch screen type of display, can be used as a user interface to visually display items (e.g., images, options, instructions, etc.) to a user and accept inputs from a user. Further, the mobile computing device 102 can include additional elements, such as keys, buttons, a track-pad, a trackball, or the like, that accept inputs from a user.

The memory 118 can be used to store software and/or firmware that controls the mobile computing device 102, as well to store images captured using the camera 104, but is not limited thereto. Various different types of memory, including non-volatile and volatile memory can be included in the mobile computing device 102. The drive unit 124, e.g., a hard drive, but not limited thereto, can also be used to store software that controls the mobile computing device 102, as well to store images captured using the camera 104, but is not limited thereto. The memory 118 and the disk unit 124 can include a machine readable medium on which is stored one or more sets of executable instructions (e.g., apps) embodying one or more of the methodologies and/or functions described herein. In place of the drive unit 124, or in addition to the drive unit, the mobile computing device can include a solid-state storage device, such as those comprising flash memory or any form of non-volatile memory. The term "machine-readable medium" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium" or "computer-readable medium" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

The transceiver 120, which is connected to an antenna 126, can be used to transmit and receive data wirelessly using, e.g., Wi-Fi, cellular communications or mobile satellite communications. The mobile computing device 102 may also be able to perform wireless communications using Bluetooth and/or other wireless technologies. It is also possible the mobile computing device 102 includes multiple types of transceivers and/or multiple types of antennas.

The speaker 122 can be used to provide auditory instructions, feedback and/or indicators to a user, playback recordings (e.g., musical recordings), as well as to enable the mobile computing device 102 to operate as a mobile phone.

The processor 116 can be used to control the various other elements of the mobile computing device 102, e.g., under control of software and/or firmware stored in the memory 118 and/or drive unit 124. It is also possible that there are multiple processors, e.g., a central processing unit (CPU) and a graphics processing unit (GPU).

Figure 2:
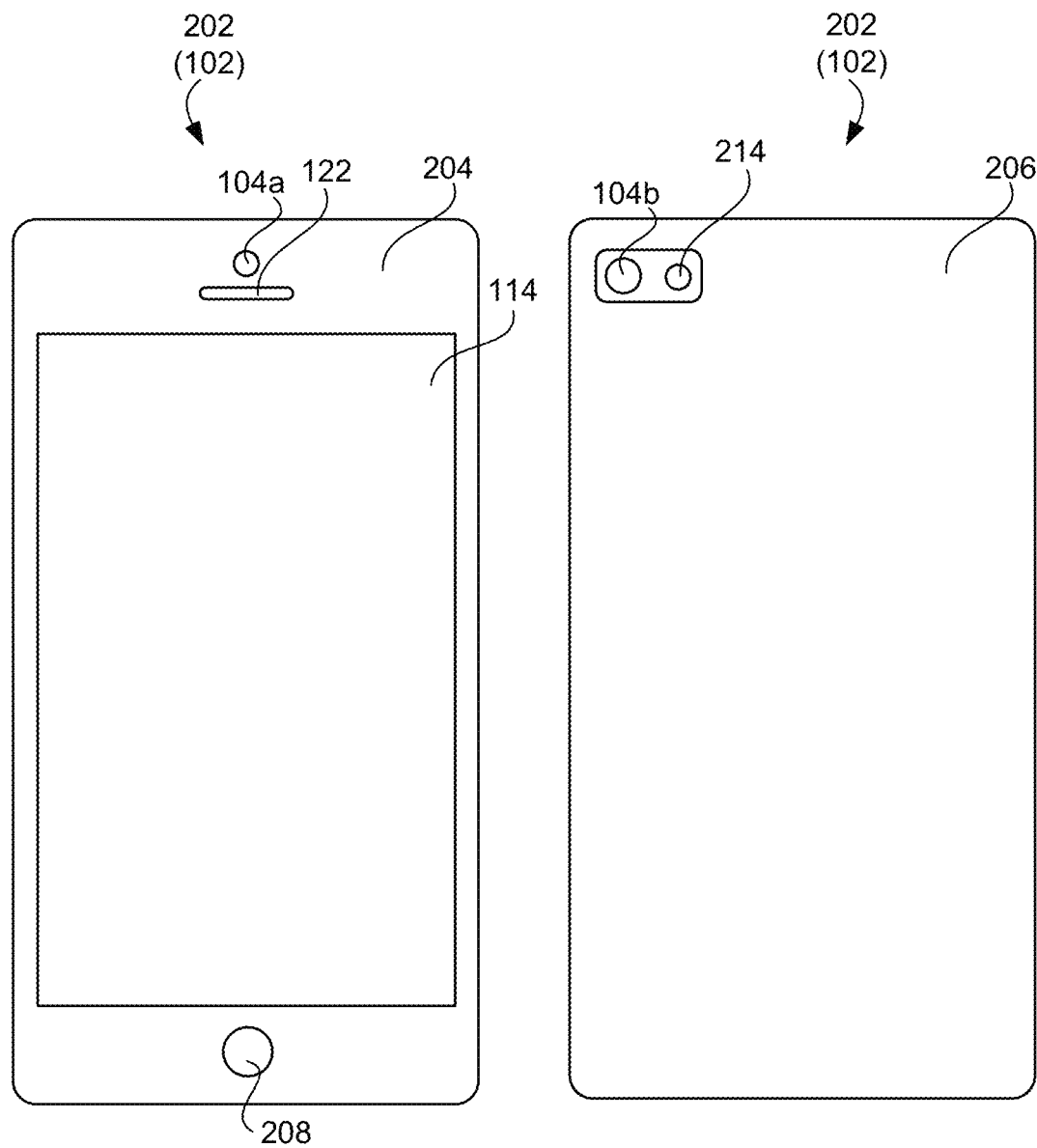
FIGS. 2A and 2B are, respectively, front and back views of an exemplary smartphone type of mobile computing device with which embodiments of the present technology can be used.

FIGS. 2A and 2B are, respectively, front and back views of an exemplary smartphone 202 type of mobile computing device 102 with which embodiments of the present technology can be used. Referring to FIG. 2A, a front 204 of the smartphone 202 is shown as including a touchscreen display 114, a button 210, a speaker 122 and a front-facing camera 104a. Referring to FIG. 2B, a back 206 of the smartphone 202 is shown as including a rear-facing camera 104b and a camera flash 214. The smartphone 202, and more generally the mobile computing device 102, can include additional buttons on the front, back and/or sides, e.g., for powering the device on and off, volume control and/or the like. In FIG. 2A the front-facing camera 104a is shown as being centered relative the sides of the smartphone 202. However, depending upon the smartphone 202, and more generally the mobile computing device 102, that is not always the case. In FIG. 2B the rear-facing camera 104b is shown as being closer to one side of the smartphone than the other, and thus, being offset relative to the sides of the smartphone 202. However, depending upon the smartphone 202, and more generally the mobile computing device 102, that is not always the case. The smartphone 202 in FIGS. 2A and 2B is arranged in what is referring to as a "portrait" position, where the height is greater than the width. If the smartphone 202 where turned sideways by 90 degrees then the smartphone 202 would be arranged in what is referred to as a "landscape" position, where the width is greater than the height.

Figure 3:
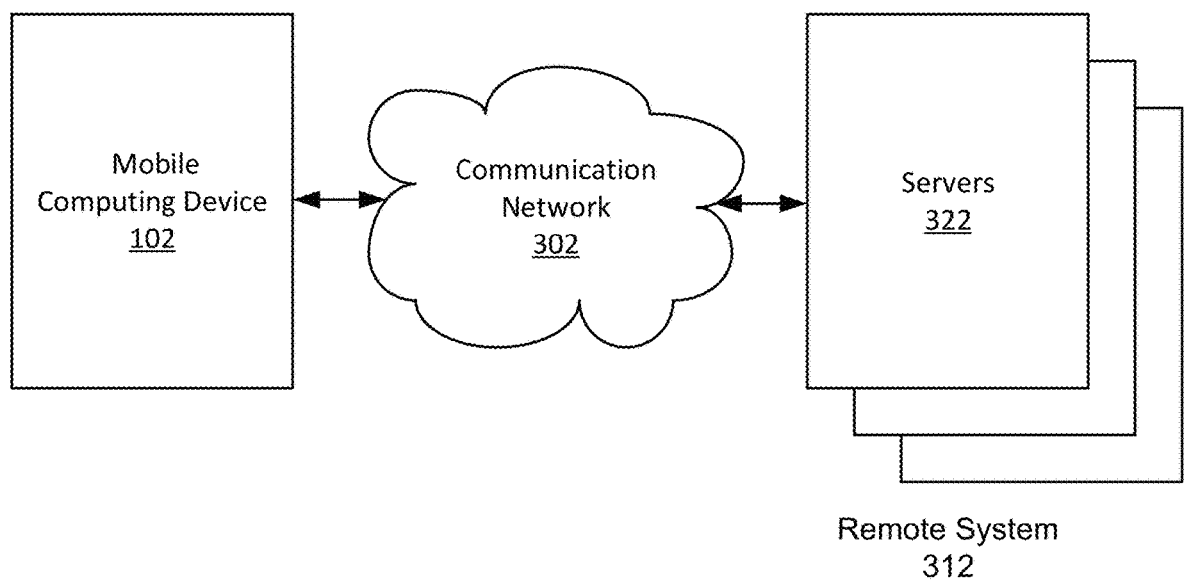
FIG. 3 is used to illustrate that a mobile computing device can use a communication network to upload data to, and download data from, a remote system that includes one or more servers.

FIG. 3 is used to illustrate that the mobile computing device 102 (such as the smartphone 202) can use a communication network 302 to upload data to, and download data from, a remote system 312 that includes one or more servers 322. Preferably, the mobile computing device 102 can achieve such uploading and downloading wirelessly. Various communication protocols may be used to facilitate communication between the various components shown in FIG. 3. These communication protocols may include, for example, TCP/IP, HTTP protocols, wireless application protocol (WAP), vendor-specific protocols, customized protocols, but are not limited thereto. While in one embodiment, communication network 202 is the Internet, in other embodiments, communication network 202 may be any suitable communication network including a local area network (LAN), a wide area network (WAN), a wireless network, an intranet, a private network, a public network, a switched network, and combinations of these, and the like.

The distributed computer network shown in FIG. 3 is merely illustrative of a computing environment in which embodiments the present technology can be implemented, but is not intended to limit the scope of the embodiments described herein. One of ordinary skill in the art would recognize other variations, modifications, and alternatives. For example, the various servers 322 may be distributed. In other words, the remote system 312 can be a distributed system. Further, the servers can include or have access to databases and/or other types of data storage components, each of which can be considered part of the remote system 312. As will be appreciated from the description below, the mobile computing device 102 can upload data to the remote system 312 so that the remote system can generate 3D models based on the uploaded data, and the remote system 312 can download data to the mobile computing device 102 so that the remote computing device 302 can display 3D models to a user of the mobile computing device.

Figure 4:
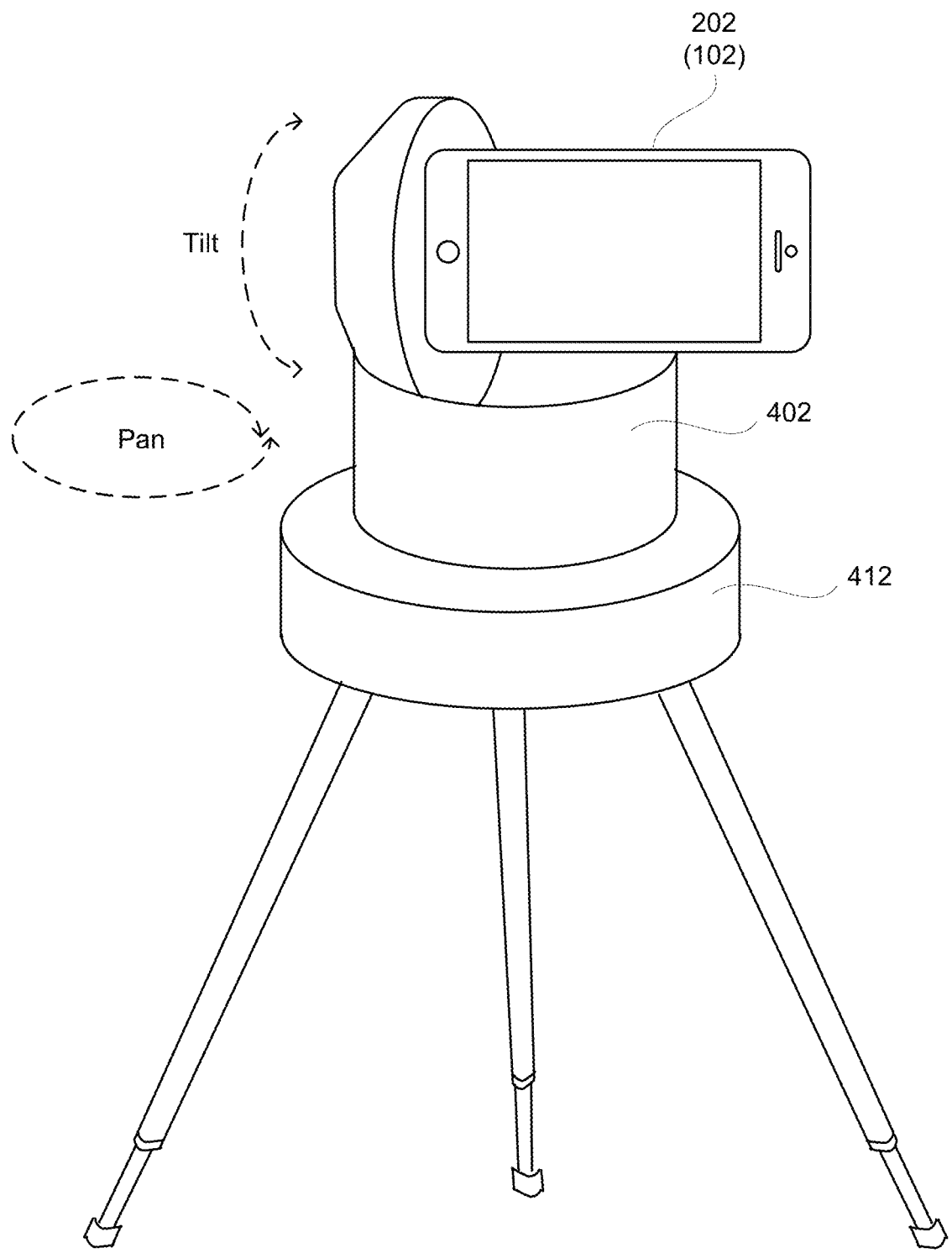
FIG. 4 shows the smartphone introduced with reference to FIGS. 2A and 2B mounted on a rotating mechanism, with the rotating mechanism mounted on a tripod.

FIG. 4 shows the smartphone 202 mounted on a rotating mechanism 402, with the rotating mechanism 402 mounted on a tripod 412. The rotating mechanism 402, which can also be referred to as a rotational mechanism 402, is preferably capable of both panning and tilting under the control of the smartphone 202 or some other controller, and thus, is preferably capable of at least two axes of movement. Preferably the rotating mechanism is capable or panning a full 360 degrees, and tilting +/−45 degrees, but is not limited thereto. The rotating mechanism 402 can include one or more motors and a rotation controller that is capable of being remotely controlled, e.g., using Bluetooth or some other wireless technology, or via a wired cable that is connected to the smartphone 202, some other mobile computing device 102 or some other remote controller. Such a rotating mechanism 402 is commercially available and is typically used for obtaining panoramic images, remote camera operation, surveillance applications, timelapse video recording and/or motion tracking. Examples such a rotating mechanism include, but are not limited to, the InsideMaps HERO Rotor device available from InsideMaps Inc. headquartered in Redwood City, Calif. and the Galileo App-Driven Motorized Camera Mount available from Motrr headquartered in Santa Cruz, Calif. Other companies that make rotating mechanisms that are capable of both panning and tilting include Bescor headquartered in Farmingdale, N.Y., and Zhongshan Yunteng Photographic Equipment Co., Ltd., head-quartered in Zhongshan, China, just to name a few.

When a smartphone 202 or other mobile computing device 102 having both a front-facing camera 104a and a rear-facing camera 104b is mounted on a rotating mechanism 402, the rear-facing camera 104b is typically used to obtain images and/or video, since the rear-facing camera 104b typically has better resolution than the front-facing camera 104a, and the focal length of the rear-facing camera 104b is typically more adjustable than the front-facing camera 104a, which may have a fixed focal length.

A stereo image pair, as the term is used herein, includes a first image and a second image of a same scene that are captured from different perspectives. Conventionally stereo image pairs (which can also be referred to as stereoscopic image pairs) have been obtained using a camera rig including two different cameras (or at least two different camera sensors) that are spaced apart from one another by a distance. It is this differences in perspective that makes stereoscopic image pairs useful for performing 3D reconstruction of a 3D scene. As noted above, stereoscopic camera rigs are very expensive and are not owned by or accessible to most people. By contrast, most people either own or have access to a smartphone, tablet or other mobile computing device. However, over ninety-nine percent of smartphones, tablet computing devices and other mobile computing devices are not designed to capture stereo image pairs. In accordance with embodiments of the present technology, which are described below, stereoscopic images are obtained using a mobile computing device (e.g., 102), such as a smartphone (e.g., 202) or a tablet computing device, that includes both a front-facing camera 104a and a rear-facing camera 104b, wherein one of the images in each stereo image pair is captured using the front-facing camera 104a and the other one of the images in each stereo image pair is captured using the rear-facing camera 104b, and wherein the first and second images of the stereo image pair are obtained at different times than one another (i.e., they are not obtained simultaneously).

Figure 5:
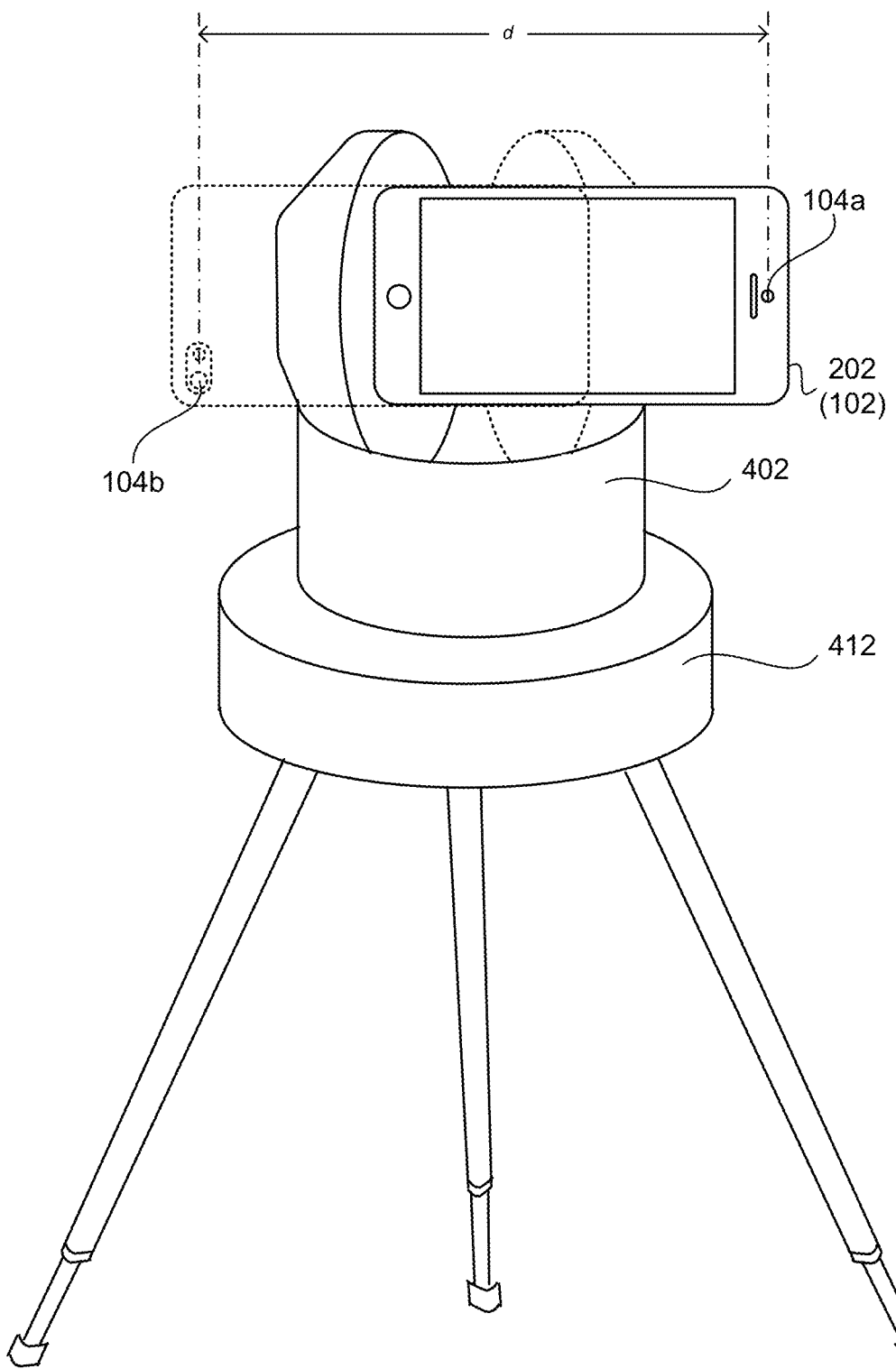
FIG. 5 shows how the front-facing camera of the smartphone when a pan angle is at 0 degrees faces a same direction as the rear-facing camera of the smartphone when the pan angle is at 180 degrees.

Referring now to FIG. 5, FIG. 5 is similar to FIG. 4 in that it shows the smartphone 202 mounted on the rotating mechanism 402, with the rotating mechanism 402 mounted on the tripod 412. The smartphone 202 shown in dotted line in FIG. 5 is the same as the smartphone 202 shown in solid line, but after the smartphone 202 has been panned by 180 degrees by the rotating mechanism 402. As can be appreciated from FIG. 5, when the smartphone 202 is in its second position (represented in dotted line) the rear-facing camera 104b faces the same direction that the front-facing camera 104a faced when the smartphone 202 was in its first position (represented in solid line), with the rear-facing camera 104b (when the smartphone 202 is in its second position) being spaced apart from the front-facing camera 104a (when the smartphone 202 is in its first position) by a distance "d". The value of the distance "d" depends, e.g., on the form factor of the smartphone 202 (or other mobile computing device 102) and the form factor of the rotating mechanism 402, and potentially additional factors. FIG. 5 illustrates how a smartphone 202 (or other mobile computing device 102 including both front- and rear-facing cameras) can be used to obtain a stereo image pair in according with embodiments of the present technology. Preferably the smartphone 202 (or other mobile computing device 102 including both front- and rear-facing cameras) is positioned in its landscape configuration when capturing images to maximize the distance between the front-facing camera 104a and the rear-facing camera 104b when the cameras are used to capture respective first and second images of a stereo image pair at different times.

Figure 6:
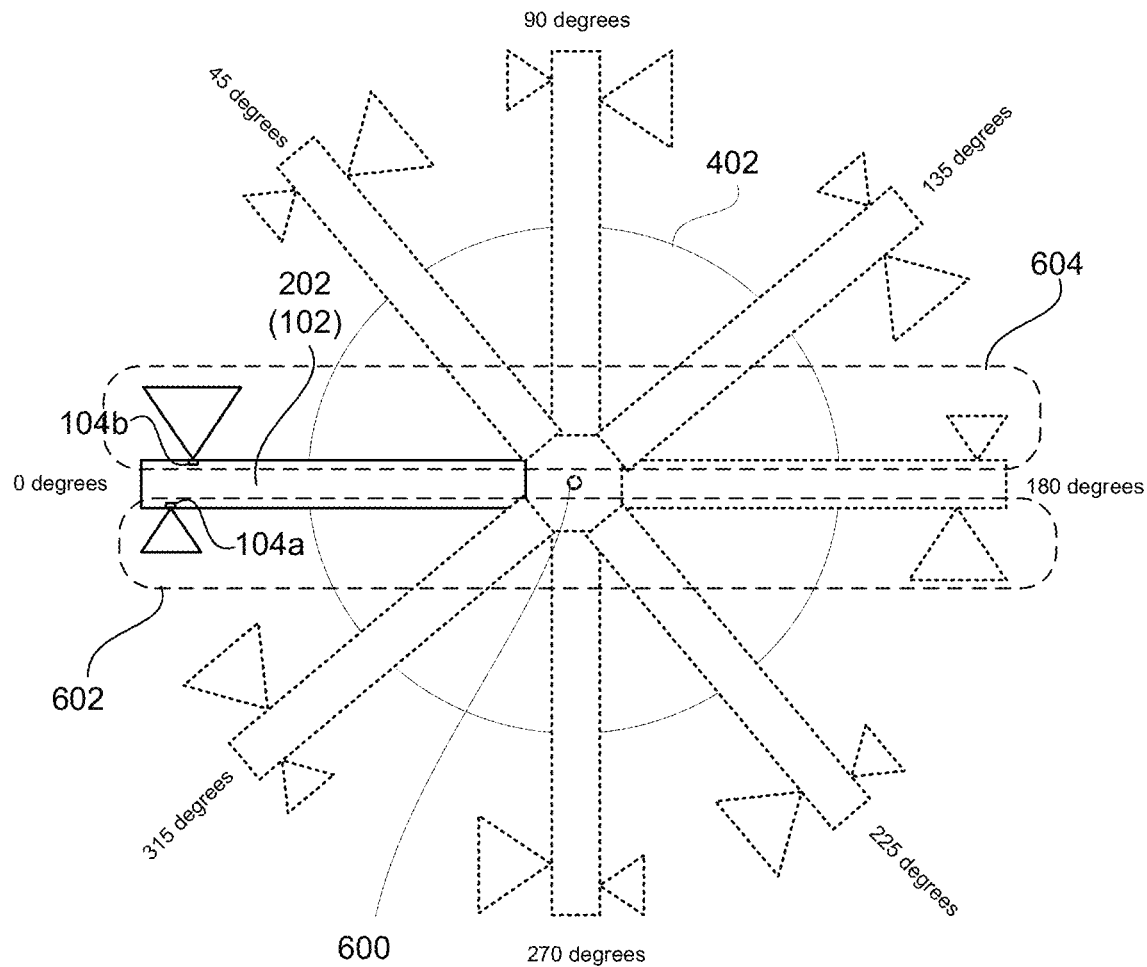
FIG. 6 shows a top down view of a smartphone positioned sideways to obtain landscape images, at various different pan angles, with each small triangle representative of the front-facing camera capturing an image, and each large triangle representative of the rear-facing camera capturing an image.

FIG. 6 shows top down view of the smartphone 202 positioned sideways to obtain landscape images. In FIG. 6, each small triangle is representative of the front-facing camera 104a capturing an image, and each large triangle is representative of the rear-facing camera 104b capturing an image. FIG. 6 shows, in dotted line, the smartphone 202 after it has been panned 45 degrees, 90 degrees, 135 degrees, 180 degrees, 225 degrees, 270 degrees, and 345 degrees. More generally, the dotted lines in FIG. 6 show how the smartphone 202 can be panned in steps (eight steps in this example) until the smartphone has been panned by a full 360 degrees. More or less than eight pan angle steps (which can also be referred to as "stops") can be used. For example, if there were 16 pan angle stops, then the smartphone 202 would be rotated by 22.5 degrees at each pan angle step. These are just examples, which are not intended to be all encompassing. In FIG. 6, the small and large triangles that are within the dashed oval labeled 602 are illustrative of a possible stereo image pair, where one of the images is captured at a point in time using the front-facing camera 104a when the pan angle is at 0 degrees, and where the other one of the image is captured at a later point in time using the rear-facing camera 104b when the pan angle is at 180 degrees. In FIG. 6, the small and large triangles that are within the dashed oval labeled 604 are illustrative of another possible stereo image pair, where one of the images is captured at a point in time using the front-facing camera 104a when the pan angle is at 180 degrees, and where the other one of the image is captured at an earlier point in time using the rear-facing camera 104b when the pan angle was at 0 degrees.

In FIG. 6, the small circle labeled 600 represents the center of rotation of the rotational mechanism 402 to which the smartphone 202 (or other mobile computing device 102) is mounted. Notice that the front- and rear-facing cameras 104a and 104b are both offset from the center or rotation 600. These offsets from the center of rotation 600 enable a stereo pair of images to be obtained with the distance "d" between the cameras 104a and 104b, or possible some other distance if images selected for a stereo image pair are not 180 degrees apart, which may occur in some instances.

In accordance with certain embodiments of the present technology, during each of the plurality of pan angle stops, the front-facing camera 104a is used to capture an image, and the back-facing camera 104b is also used to capture a separate image. Each such image is stored, e.g., in the memory 118 or drive unit 124 of the smartphone 202 (or other mobile computing device 102) along with corresponding metadata, which can include, e.g., the pan angle and tilt angle of the smartphone 202 and/or rotating mechanism 402, and the time that the image was captured. Additionally, or alternatively, the images and metadata can be stored remotely, e.g., on a cloud based server, but not limited thereto. Such metadata can include sensor data obtained by sensors within the smartphone 202 (or other mobile computing device 102), such as, but not limited to, accelerometer data, magnetometer data and/or gyroscope data. Additional types of metadata can include compass data and altimeter data, but is not limited thereto.

The rotating mechanism 402 can then pan the smartphone until it is at its next pan angle stop, and the front- and rear-facing cameras 104a and 104b can again be used to capture respective images. This process can be repeated until the smartphone 202 has been panned by a full 360 degrees, where the goal is to image an entire 360 degrees of a room or other environment.

During each pan angle stop (which can also be referred to as a pan angle step), the front-facing camera 104a can capture a single image and the back-facing camera 104b can capture a single image. However, more preferably, to provide for better 3D reconstruction of a room or other environment, during each pan angle stop the rotating mechanism 402 is controlled to also tilt the smartphone 202 (or other mobile computing device 102) and images are captured by each of the front- and rear-facing cameras 104a and 104b at each of a plurality of tilt angles. For example, at each of N pan angle steps or stops, the rotating mechanism 402 can position the smartphone 202 (or other mobile computing device 102) at M different tilt angles. For example, if M=2, then the tilt angles can be +30 degrees and −30 degrees. If M=3, then the tilt angles can be +40 degrees, 0 degrees, and −40 degrees. If M=4, then the tilt angles can be +30 degrees, +10 degrees, −10 degrees and −30 degrees. There are just a few examples, which are not intended to be all encompassing. Preferably the tilt angles are selected so that images are captured of entire walls within a room, as wells as portions of the ceiling and floor that are adjacent the walls.

At each of the M tilt angles, both the front and rear-facing cameras 104a and 104b are used to capture a respective image. When the smartphone 202 (or other mobile computing device 102) is at a 0 degree tilt angle (i.e., parallel to the surface of the Earth), both the front-facing camera 104a and the rear-facing camera will be at a 0 degree tilt angle. However, when the smartphone 202 (or other mobile computing device 102) is at a non-zero degree tilt angle, e.g., at +30 degrees, the front-facing camera 104a is also tilted at +30 degrees, but the back-facing camera is tilted at −30 degrees. When the smartphone 202 (or other mobile computing device 102) is tilted at −30 degrees, the front-facing camera 104a is also tilted at −30 degrees, but the back-facing camera is tilted at +30 degrees. More generally, whenever the smartphone 202 (or other mobile computing device 102) is at a non-zero degree tilt angle, the front- and rear-facing cameras will have the same tilt angle magnitude, but one will have a positive tilt angle and the other will have a negative tilt angle.

At each pan angle and tilt angle combination, the front- and rear-facing cameras 104a and 104b can each capture a single image at a single exposure setting. In accordance with certain embodiments, at each pan angle and tilt angle combination, the front- and rear-facing cameras 104a and 104b can each capture images at multiple (e.g., two, three or four) different exposure settings. For example, three different images, each at a different exposure setting, can be captured by each of the front- and rear-facing cameras 104a and 104b at each pan angle and tilt angle combination. The three different exposure settings can be, e.g., used to capture an underexposed image, a normally exposed image and an overexposed image. Capturing a same image at different exposures enables better 3D reconstruction within rooms or other environments where there can be significant variations in brightness, such as where images are of a wall including a window that is letting in large amounts of light from outside. In such an example, a normally exposed image can be good for identifying features within the room and the underexposed image can be good for identifying features outside with window. Overexposed images can be good for identifying features in dark corners or shadows, for example. In certain embodiments, the plurality of images that are captured using a same one of the front- and rear-facing cameras 104a and 104b at different exposures are used to perform high-dynamic range (HDR) imaging, which involves merging multiple low or standard dynamic range images that are captured by the smartphone 202 (or other mobile computing device 102).

Figure 9:
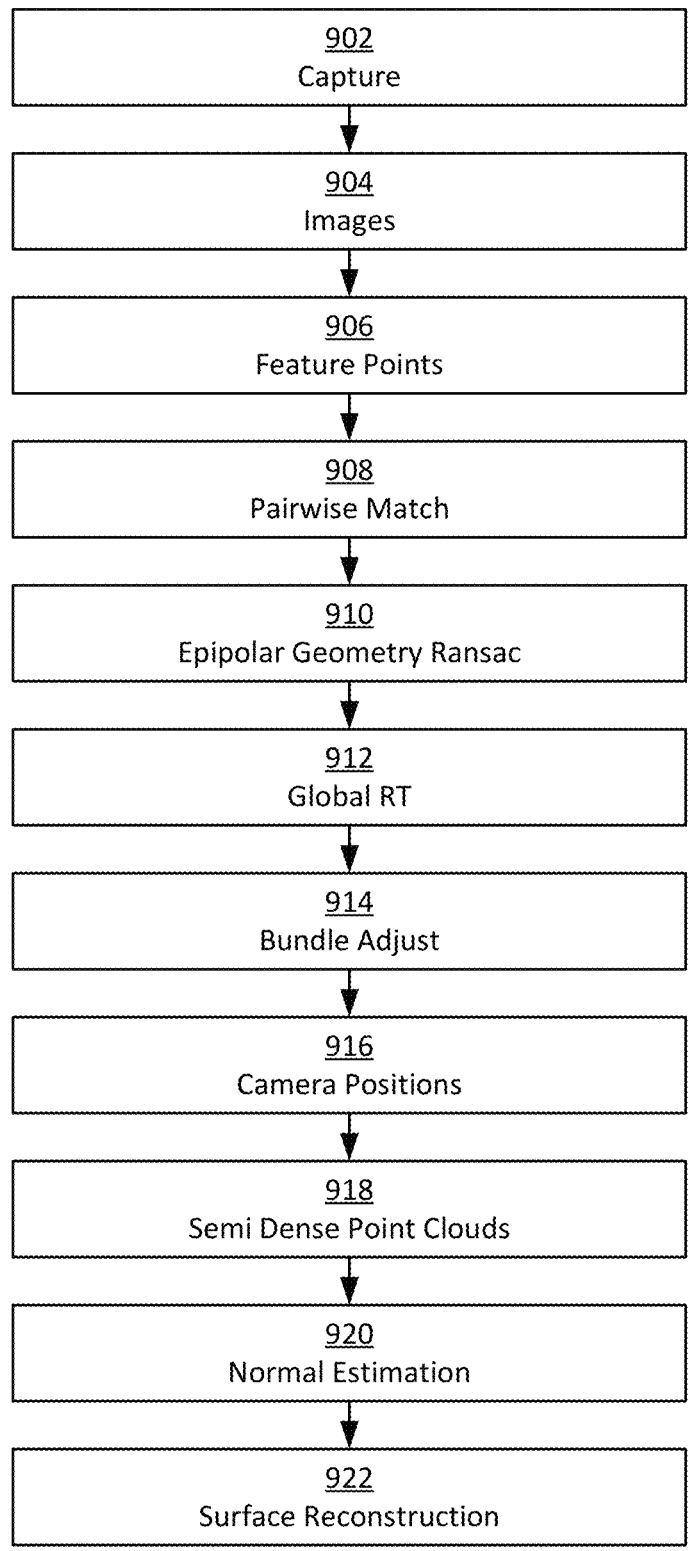
FIG. 9 illustrates an exemplary structure from motion pipeline that can be used to generate three-dimensional models of rooms or other environments from images captured using embodiments of the present technology.

After images of a room or other environment have been captured using both front- and rear-facing cameras 104a and 104b of a mobile computing device 102 (e.g., a smartphone 202), computer vision and geometric confinement can be used to perform 3D reconstruction of the room or other environment. This can include detecting features, such as corners and blobs, within captured images. Features of different images can then be compared so at to identify the same features in different images. In other words, features in different images can be compared to detect visual correspondences. Structure from Motion (SfM) software and/or hardware can then be used to perform 3D reconstruction of the room or other environment. FIG. 9 below is used to describe how this may be accomplished.

In accordance with certain embodiments, various features described herein can be performed under the control of a mobile application that is downloaded to, stored on, and executed by the mobile computing device 102. For example, where the mobile computing device 102 is a smartphone or tablet computing device, various features described herein can be performed under the control of a mobile application, which is also known as a mobile app, or simply an app. Such a mobile application can be available for download from an application store or directly from a software vender, for free, or for a fee. In accordance with certain embodiments of the present technology, the mobile application controls aspects of both the mobile computing device 102 and the rotational mechanism 402 on which the mobile computing device 102 is mounted, to thereby cause images and corresponding metadata to be captured and stored for use in producing a 3D model of a room or other environment.

The terms "imaging" and "capturing", as used herein, are used interchangeably typically to refer to the obtaining or taking of images using a camera of a mobile computing device. Further, if a room (or a portion thereof) has already been "imaged" or "captured", that means images for that room (or a portion thereof) have already been obtained using the mobile computing device.

The 3D model of a room or other environment can be produced by the mobile computing device 102 that captured the images of the room or other environment. Alternatively, obtained images and metadata corresponding to the images are uploaded to a remote system (e.g., 312 in FIG. 2) that includes SfM software and sufficient processing resources to generate a 3D model of a room based on images of the room within a relatively short period of time. Preferably, the images and corresponding metadata for a room or other environment are uploaded to the remote system as soon as all of the images for the room or other environment are obtained, so that the remote system can begin to generate a 3D model of the room while images of a next room or other environment are being obtained by the mobile computing device 102. It would also be possible to begin uploading images and corresponding orientation data for a room or other environment, to the remote system, before all of the images and corresponding orientation data are obtained for the room or other environment. Alternatively, the uploading can be initiated after all the images and corresponding orientation data are obtained for all of the rooms or other portions of a project.

Where images and metadata are transferred to a remote system, after the remote system uses SfM software to generate 3D models of the rooms that have been imaged by the mobile computing device 102, data that enables 3D models to be displayed on the mobile computing device 102 is downloaded to the mobile computing device 102. Using such data and the mobile application, the mobile computing device 102 can display 3D models of one or more rooms or another environment.

Figure 7:
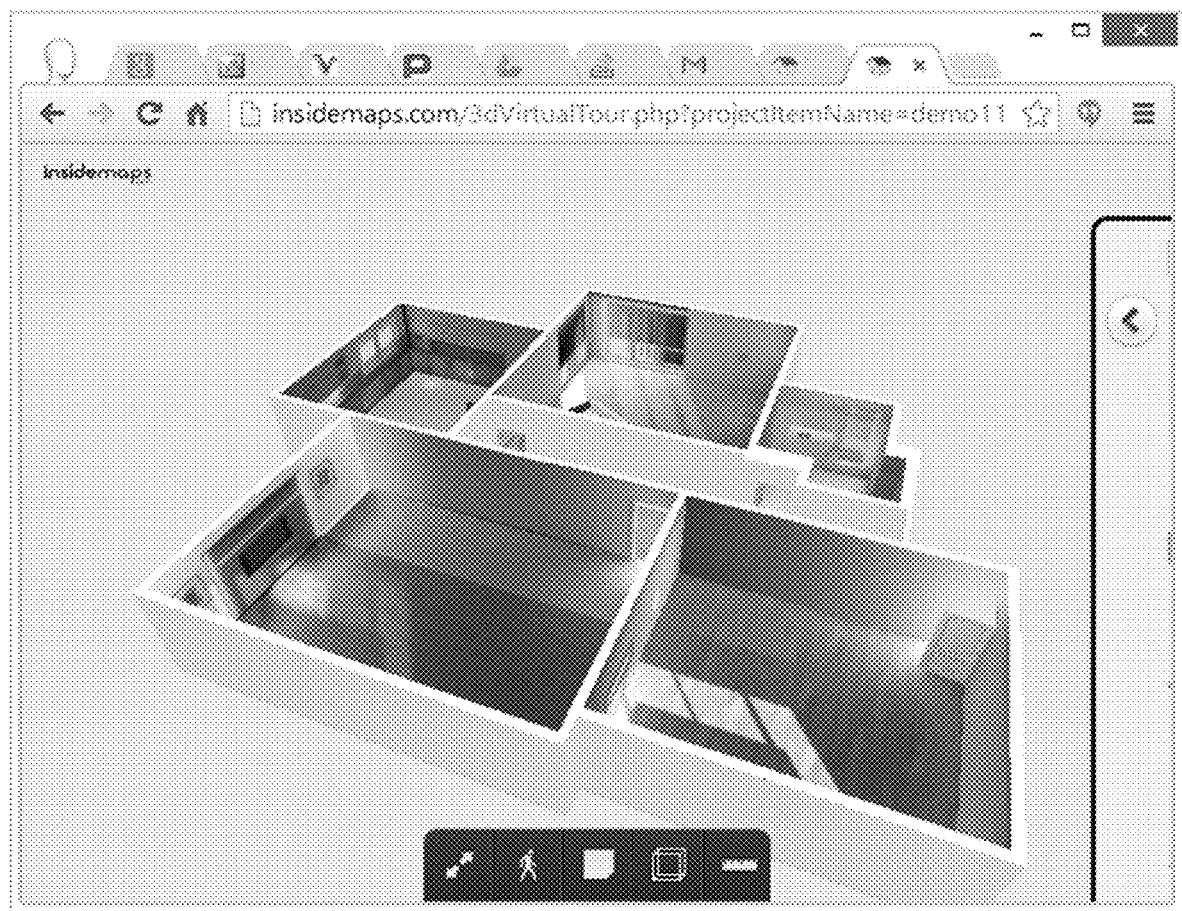
FIG. 7 illustrates an exemplary screen shot of a three-dimensional model generated using embodiments described herein displayed on a display of a mobile computing device.

FIG. 7 illustrates an exemplary screen shot of a 3D model as displayed on the display 114 of the mobile computing device 102. In accordance with an embodiment, the 3D model is actually hosted by the remote system 312, e.g., on a web-server, and the mobile computing device 102 can be used to observe and manipulate the 3D model using a web-browser installed on the mobile computing device 102. In such an embodiment, the mobile computing device 102 can receive data that specifies a link to the web page through which the 3D model can be observed. In a specific embodiment, the mobile computing device can automatically pull up the browser and link to the correct web page in response to receiving the data from the remote system 312. The user can also forward web page links to other people (e.g., an interior designer, or an architect) so that such other people can similarly use a web browser to observe the 3D model. The user may also access the web page using some other computing device, which may or may not be a mobile computing device. The 3D model can be used, e.g., to view virtual furniture at different locations within a room, view how carpets or rugs may look in a room, view how walls may look if repainted or removed, and the like.

Figure 8:
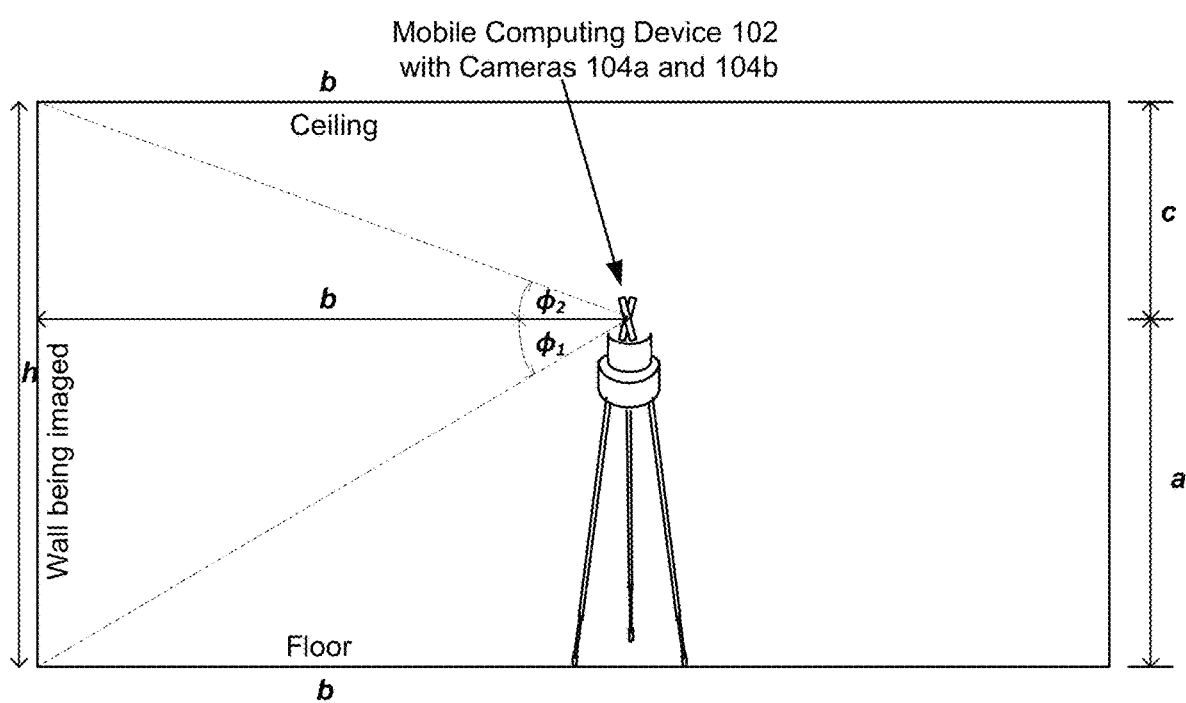
FIG. 8 is used to explain one technique that can be used to estimate the height of a wall in accordance with an embodiment.

In accordance with certain embodiments, the mobile application can estimate the height of a wall based on metadata (obtained using the sensors 106, 108 and/or 110) that corresponds to images that were obtained while the cameras 104a and 104b of the mobile computing device 102 were aimed at a floor line and at a ceiling line. Based on the estimated height of the wall, the mobile application may determine whether additional images of a wall need to be obtained before the mobile computing device is panned to another pan angle stop. FIG. 8 is used to explain one technique that can be used to estimate the height of a wall, according to an embodiment, based on orientation information (obtained using the sensors 106, 108 and/or 110) that corresponds to images that were obtained while the camera was aimed at the floor line and the camera was aimed at the ceiling line. Referring to FIG. 8, the reference "a" illustrates a height of the mobile computing device used to obtain images. In other words, "a" is the height between the floor and the mobile computing device 102. The value for "a" can be a predetermined value that is based on an estimated average height of users (e.g., 5' 6", but not limited thereto). Alternatively, to increase accuracy, a user can be asked to enter the height of the tripod or rotating mechanism, so that the value for "a" is more accurate, and thus, any calculation based on this value will be more accurate. Still referring to FIG. 8, $\phi_1$ is the angle of the mobile computing device 102 when the camera 104a of the mobile computing device 102 is aimed at the floor line that separates a wall from the floor, and $\phi_2$ is the angle of the mobile computing device 102 when the camera 104a of the mobile computing device 102 is aimed at the ceiling line that separates the wall from the ceiling. The angles $\phi_1$ and $\phi_2$ can be obtained using the accelerometer 106 and/or the gyroscope 110 included within the mobile computer device 102. The reference "b" is the distance from the mobile computing device 102 to the wall being imaged. The reference "c" is the height between the mobile computing device 102 and the ceiling. The reference "h" is the height of the wall being imaged, which is the height being estimated. In accordance with an embodiment, the following equations are used to estimate the height (h) of the wall being imaged:

$$b = a/\tan(\phi_1);$$

$$c = b*\tan(\phi_2); \text{ and}$$

$$h = a + c.$$

The orientation data corresponding to each image is an example of metadata corresponding to each image. For example, such metadata can include information obtained from the accelerometer 106, the magnetometer 108 and/or the gyroscope 110. The metadata can also include camera exposure settings (e.g., exposure time and aperture setting) and/or ambient light levels corresponding to each image. Non-sensor type metadata can also be associated with each image. For example, each of the images can be numbered and/or time stamped. In other words, the metadata for each image can include an image number and/or a time stamp. Each captured image should preferably overlap with at least one other image, and likely with at least two other images, to ensure that there are no portions of the walls that have not been captured in the images of a room. To enable the SfM software to generate 3D models of rooms more efficiently, the metadata for an image can also identify the other image(s) that the image overlaps with. In this manner, the metadata can be used to avoid perceptual aliasing. The metadata for an image can also include information about the wall included in the image and the room of which the wall is a part.

For another example, the metadata for each image can include the project name and/or the room name. One of ordinary skill in the art reading this disclosure would appreciate that alternative and/or additional types of metadata can be associated with each of the images.

In accordance with certain embodiments, approximately 20 to 30 images of each wall in a room with obtained. However, it is also possible that less than 20 or more 30 images can be obtained for each wall.

In accordance with certain embodiments, the mobile computing device monitors lighting conditions and/or exposure settings used when the camera obtains images, and the mobile computing device under control of the mobile application may take additional exposure brackets at uneven light levels, e.g., caused by windows, lamps or skylights. This reduces the probability that the only images of a particular portion of a room are underexposed or overexposed.

In accordance with certain embodiments, the mobile computing device 102 and/or the remote system 312 performs a lookup from a database and/or uses an application program interface (API) to obtain known geometrical configuration information for the front- and rear-facing cameras 104a and 104b of the mobile computing device 102 that is being used to capture images. Such information can be used, e.g., to determine the distance between the location of the front-facing camera 104a at a specific pan angle and the rear-facing camera 104b after the mobile computing device 102 has been panned 180 degrees (or some other pan angle). In other words, such information can be used to determine the distance between two cameras used to obtain a stereo image pair.

In accordance with certain embodiments, the mobile computing device 102 and/or the remote system 312 performs a lookup from a database and/or uses an API to obtain internal configuration information about the front- and rear-facing cameras 104a and 104b of the mobile computing device 102, such as information about focal lengths, lens distortions and/or principal points, but not limited thereto.

In accordance with certain embodiments, the mobile computing device 102 and/or the remote system 312 performs a lookup from a database and/or uses an API to obtain geometrical configuration associated with the rotating mechanism 402, which information can be used to determine how far each of the front- and rear-facing cameras 104a and 104b is from a center of rotation, and/or to determine an expected accuracy of metadata obtained from the rotating mechanism.

In accordance with certain embodiments, auto-focus mechanisms can be accounted for in bundle adjustments.

As discussed above with reference to FIG. 5, when the front- and rear-facing cameras 104a and 104b are panned 180 degrees relative to one another, there is a distance "d" between the two cameras that can be calculated. Knowledge of this distance is used when generating a 3D model of a room or other environment based on stereo image pairs. In accordance with certain embodiments, a best stereo image pair of a scene can be assumed to include a first image captured by the front-facing camera 104a at a certain pan angle and a certain tilt angle, and a second image capture by the rear-facing camera 104b when the pan angle is 180 degrees offset from the certain pan angle when the first image is/was obtained by the front-facing camera 104a and tilt angle is the same. This will often be the case. However, this may not always be the case where an object in a scene is close to the mobile computing device 102, in which case the same features may not be captured by the front- and rear-facing cameras 104a and 104b when they are panned 180 degrees relative to one another. For example, a better stereo pair may be obtained when the front- and rear-facing cameras 104a and 104b are only panned 135 degrees relative to one another because there is a better overlap of identifiable features (e.g., corners and/or blobs) in images captured by the front- and rear-facing cameras 104a and 104b when panned 135 degrees relative to one another. Where this is the case, the distance between the front- and rear-facing cameras 104a and 104b when the image pair is obtained is not exactly "d" shown in FIG. 5, but rather, may be more analogous to the hypotenuse of a triangle, which distance can be calculated from geometrical information obtained from databases and/or using APIs.

The SfM software and the hardware (e.g., one or more servers) executing the software can collectively be referred to as a SfM engine. Typically, a SfM engine only uses about 30% of the images it accepts to generate 3D models. By contrast, because the embodiments described herein primarily obtain images that are actually useful for generating 3D models, and minimizes redundant images, a SfM engine will likely use over 90% of the images it receives from the mobile computing device 102.

FIG. 9 illustrates an exemplary SfM pipeline that can be used to generate 3D models of rooms (or other environments) from captured images. Certain embodiments of the present technology primarily relate to the capture stage 902, which results in images 904. The remaining stages in the pipeline can be implemented by the SfM engine likely, but not necessarily, hosted by the remote system 312. Steps or stages 906-922 can be performed or realized using one or more processors executing software. The images 904 are provided to a feature point extractor stage 906, which can extract feature points from the images that enable common areas in different images (e.g., stereo image pairs) to be matched to one another by a pairwise match stage 908. More specifically, the pairwise match state 908 can be used to identify stereo image pairs. Feature point extraction can be performed, e.g., using a scale-invariant feature transform (or SIFT), which is an algorithm in computer vision used to detect and describe local features in images. Feature points are areas of the images that can be classified and described such that a same area can be detected and matched in more than one image. Exemplary feature points include, but are not limited to, corners and blobs. The pairwise matching stage 908 can also be used to match features between pairs of images. When images are pairwise matched, each image can be pairwise matched to all other images, or if certain structure of the capture is known they can be pairwise matched to a smaller subset of the other images. For example, metadata associated with images can be used to reduce the pairwise matching that is performed, e.g., to eliminate pairwise matching of images of walls that are located in completely different rooms. Matching can then be refined using an epipolar geometry random sample consensus (RANSAC) stage 910, e.g., to estimate fundamental matrices between pairs of images. For example, stage 910 can involve simultaneously calculating the motion between the images and the positions of feature points in 3D space, where two cameras define an epipolar geometry that can also be used to eliminate mismatches. Once the motion between the image pairs are determined, an overall global motion can be calculated from the pairwise estimations of movement, which includes both rotation (R) and translation (T), at a global RT stage 912. At a bundle adjust stage 914, a bundle adjustment can be performed to increase accuracy, e.g., by reducing and preferably minimizing re-projection errors. A bundle adjustment is a type of non-linear optimization that can be performed, e.g., using the Levenberg-Marquardt algorithm (LMA), which is also known as the damped least-squares (DLS) method, or using a gradient descent. Results of the global RT stage 912 and bundle adjustment stage 914 include camera positions 916. A semi-dense point clouds stage 918 uses the calculated camera positions to create a semi dense point cloud, e.g., using a stereo method of calculating disparity that relies on a sum of absolute differences (SAD) algorithm. At stage 920, semi dense point cloud normals can be estimated. At stage 922, the normals and the semi dense point cloud can be recreated, e.g., using a Poission surface reconstruction. The description of FIG. 9 was only included to describe an example of an SfM pipeline. Alternatively SfM pipelines, or more generally, alternative algorithms for generating 3D models based on captured images can be used.

In accordance with certain embodiments, constraints can be added to the bundle adjustments based on the knowledge of geometrical and/or internal configurations of the front- and rear-facing cameras 104a and 104b of the mobile computing device 102 that is being used to capture images. Constraints can additionally or alternatively be added from the known geometry and operation of the rotational mechanism 402. For an example, a noise model for the constraints can be calculated in relation to visual correspondences. Constraints can also be added for stored metadata obtained from sensors so that geometries can be extracted even if no visual correspondences are extracted between images. Constraints can also be added for expected pan and tilt angles to account for the actual angles being different than those requested or otherwise commanded.

In accordance with certain embodiments, algorithms can utilize more than stereo image pairs to extract 3D structure from images. For example, more than two images of a portion of a scene can be used to extract 3D structure. In certain embodiments, after a point cloud has been extracted, the geometrical configuration and images can be used to refine a mesh representing the 3D structure of a captured scene.

Referring again to FIG. 2, the remote system 312, while attempting to generate a 3D model, may determine that certain images beneficial or necessary to generating the 3D model are missing. In such a case the remote system 312 may inform the mobile computing device 102 of the missing images, in response to which the mobile computing device 102 can control the front- and/or rear-facing cameras 104a and/or 104b to obtain the missing images.

The cameras 104a and 104b of the mobile computing device can include, e.g., a CMOS or CCD image sensor(s) that enables colored images, which are sometimes referred to as RGB or RGBA images, to be obtained. Such images can be stored, e.g., in the JPEG file format, or some alternative file formal, such as, but not limited to, Exif, TIFF, RAW, GIF, BMP, PNG, PPM, PAM, or WEBP. The use of other types of cameras and other types of images are also possible, and within the scope of embodiments of the present technology. Any of the above mentioned types of images can be used to generate 3D models using a SfM engine. It is also possible that a mobile computing device can include more than one type of camera, and thus, can obtain more than one type of images. In such a case, a SfM engine that receives images from the mobile computing device can generate 3D models using different types of images, or just a single type of images.

Preferably, embodiments of the present technology can be used to obtain all the images necessary for generating a 3D model of one room in five minutes or less, and preferably in about two minutes, such that all the images need generate a 3D model of a ten room building can be obtained in about twenty minutes.

Beneficially, certain embodiments described herein can utilize an off-the-shelf mobile computing devices 102 (e.g., smartphones or tablet computers) and an off-the-shelf rotational mechanism 402 to provide for an accurate, fast and inexpensive 3D scanner.

A "baseline ratio" of a stereo image pair, as the term is used herein, is the ratio of the distance between cameras 104a and 104b used to obtain the first and second images (e.g., the distance "d" in FIG. 5) over the distance from the cameras to the scene being imaged. Embodiments of the present invention provide for a baseline ratio that is good for use imaging typical room sizes.

Beneficially, existing stereo vision algorithms can be used to produce 3D models based on stereo image pairs obtained using embodiments of the present technology. Accordingly, custom algorithms need not be created, but nevertheless, may be created.

Beneficially, by capturing one or more images using the front-facing camera 104a and capturing one or more separate images using the back-facing camera 104b at each pan angle stop (and tilt angle stop), the rotational mechanism 402 (and more specifically the tripod 412, if the rotational mechanism is mounted thereon) need only be placed at one location in a room or other environment to obtain all the images necessary to produce a 3D model of the room.

Embodiments of the present technology can also be used for capturing virtual reality (VR) content. In other words, the embodiments described herein can be used to capture images used to produce VR content in place of dedicated VR cameras that include numerous cameras and are typically very expensive.

Figure 10:
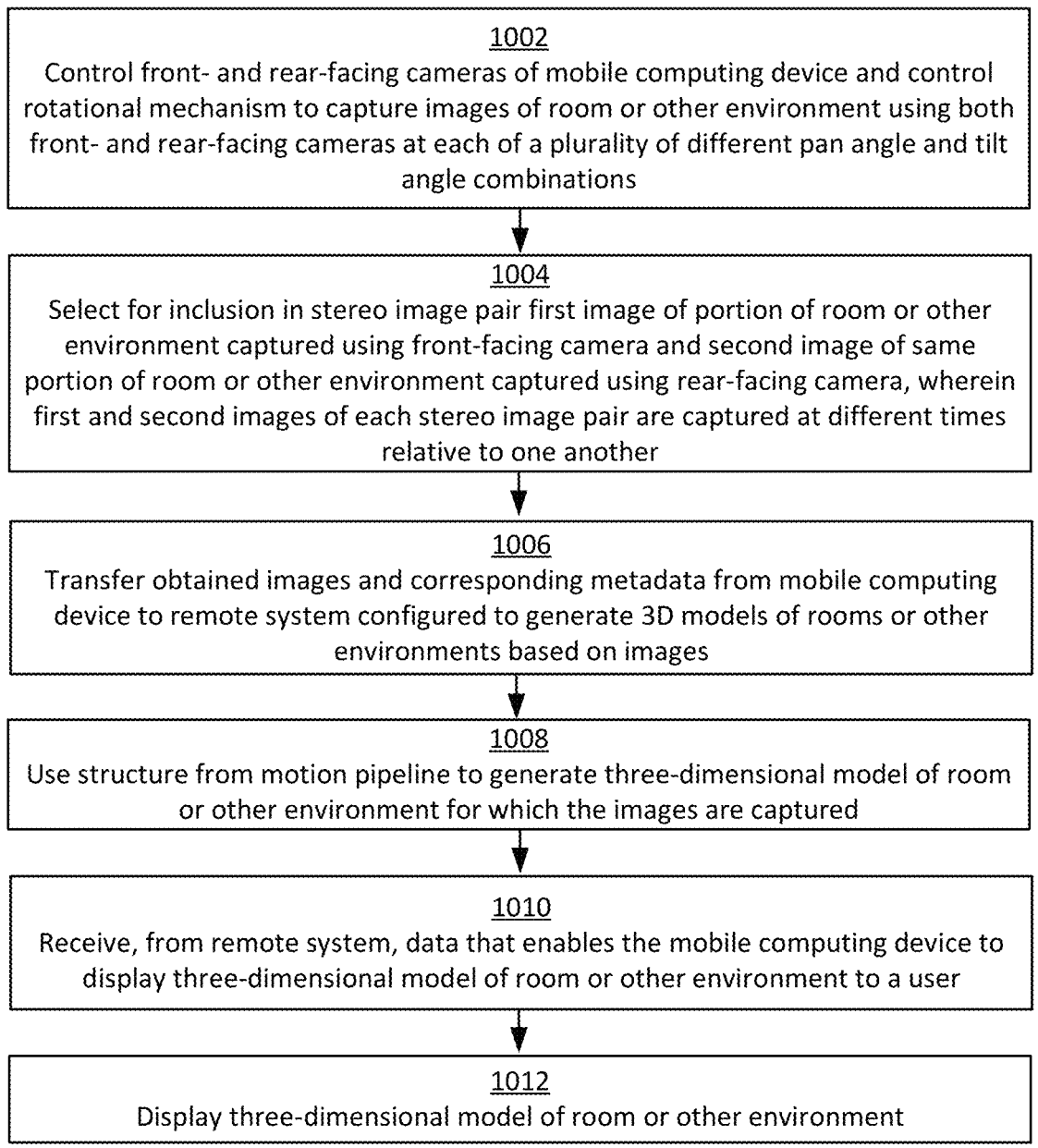
FIG. 10 is a high level flow diagram that is used to summarize methods according to certain embodiments of the present technology.

FIG. 10 is a high level flow diagram that is used to summarize methods according to certain embodiments of the present technology. The methods summarized with reference to FIG. 10 are for use with a mobile computing device (e.g., 102 or 202), which includes a front-facing camera (e.g., 104a) and a back-facing camera (e.g., 104b), and which is mounted on a rotational mechanism (e.g., 402) such that the front- and rear-facing cameras of the mobile computing device are each offset from a center or rotation of the rotational mechanism. Such methods can be used for obtaining stereo image pairs that can be used for generating three-dimensional models of a room or other environment or producing virtual reality (VR) content. The mobile computing device can be, e.g., a smartphone or a tablet computing device, but is not limited thereto. In such an embodiment, the controlling of the cameras of the mobile computing device and the controlling the rotational mechanism can be performed by an application downloaded to a smartphone or tablet computing device.

Referring to FIG. 10, step 1002 involves controlling the cameras (e.g., 104a and 104b) of the mobile computing device and controlling the rotational mechanism (e.g., 402) to capture images of the room or other environment using both the front- and rear-facing cameras at each of a plurality of different pan angle and tilt angle combinations, such that images corresponding to different tilt angles are obtained by each of the front- and rear-facing cameras of the mobile computing device at each of a plurality of different pan angles. In certain embodiments, a plurality of images are captured at each pan angle and tilt angle combination, with each of the images captured using a different exposure setting, which can include, e.g., an underexposed image, a normally exposed image and an overexposed image. As explained in additional detail above, capturing a same image at different exposures enables better three-dimensional reconstruction within rooms or other environments where there can be significant variations in brightness, such as where images are of a wall including a window that is letting in large amounts of light from outside. In accordance with certain preferred embodiments, step 1002 is performed by an application downloaded to mobile computing device, which as noted above, may be a smartphone or tablet computing device.

Step 1004 involves selecting for inclusion in a stereo image pair a first image of a portion of the room or other environment captured using the front-facing camera and a second image of the portion of the room or other environment captured using the rear-facing camera, wherein the first and second images of each stereo image pair are captured at different times relative to one another. Step 1004 can be performed by the mobile computing device. Alternatively, step 1004 can be performed by a remote system. Step 1004 can be at least partially performed as part of step or stage 908 discussed above with reference to FIG. 9.

In accordance with certain embodiments, as indicated at step 1006, the obtained images and corresponding metadata are transferred from the mobile computing device to a remote system (e.g., 312) that is configured to generate three-dimensional models of rooms or other environments based on images. The metadata can include for each captured image, e.g., the pan angle and tilt angle of the mobile computing device and/or rotating mechanism, the time that the image was captured, sensor data obtained by sensors within the mobile computing device, such as, but not limited to, accelerometer data, magnetometer data and/or gyroscope data. Additional types of metadata can include compass data and altimeter data, but is not limited thereto. The metadata can also specify which two images are included in each stereo image pair. As noted above, step 1004 can be performed by the mobile computing device. Alternatively, step 1004 can be performed by the remote system, in which case step 1004 would occur after step 1006, e.g., between steps 1006 and 1008, or concurrently with step 1008.

At step 1008, a structure from motion pipeline is used to generate a three-dimensional model of the room or other environment for which the images are captured. In accordance with certain embodiments, the structure from motion pipeline includes a bundle adjustment stage, and the method includes specifying constraints for the bundle adjustment stage based on geometrical configuration information associated with the mobile computing device, internal configuration information associated with the mobile computing device, and/or geometrical configuration information associated with the rotational mechanism. An exemplary structure from motion pipeline was described above with reference to FIG. 9.

At step 1010 data that enables the mobile computing device to display a three-dimensional model of the room or other environment is received from the remote system (e.g., 312). At step 1012 the three-dimensional model of the room or other environment is displayed, e.g., on a display screen (e.g., 114) of the mobile computing device. In certain embodiments, step 1008 is performed by the remote system (e.g., 312). In other embodiments, step 1008 is performed by the mobile computing device, in which case steps 1006 and 1010 can be eliminated, and in which case step 1004 is performed by the mobile computing device.

While various embodiments of the present technology have been described above, it should be understood that they have been presented by way of example, and not limitation. It will be apparent to persons skilled in the relevant art that various changes in form and detail can be made therein without departing from the spirit and scope of the technology.

What is claimed:

1. For use with a mobile computing device, a method for use in obtaining a plurality of stereo image pairs that can be used for generating a three-dimensional (3D) model of a room or other environment or producing virtual reality (VR) content, wherein the mobile computing device includes a front-facing camera and a rear-facing camera and is mounted on a rotational mechanism such that the front- and rear-facing cameras of the mobile computing device are each offset from a center of rotation of the rotational mechanism, the method comprising:

controlling the front- and rear-facing cameras of the mobile computing device and controlling the rotational mechanism to capture images of the room or other environment using both the front- and rear-facing cameras at each of a plurality of different pan angle and tilt angle combinations, such that images corresponding to different tilt angles are obtained by each of the front- and rear-facing cameras of the mobile computing device at each of a plurality of different pan angles;

selecting, for inclusion in a stereo image pair, a first image of a portion of the room or other environment captured using the front-facing camera and a second image of the portion of the room or other environment captured using the rear-facing camera, wherein the first and second images of the stereo image pair are captured, respectively, at first and second times that differ from one another; and repeating the selecting step a plurality of times to thereby obtain a plurality of stereo image pairs that can be used for generating a 3D model of the room or other environment or producing VR content;

wherein the controlling the front- and rear-facing cameras and the controlling the rotational mechanism on which the mobile computing device is mounted are performed by an application installed on and executed by the mobile computing device.

2. The method of claim 1, wherein:

when selecting the first and second images for inclusion in a said stereo image pair, the first image, which is selected for inclusion in the stereo image pair, is captured at the first time using the front-facing camera when the rotational mechanism is at a first pan angle and at a first tilt angle, and the second image, which is selected for inclusion in the stereo image pair, is captured at the second time using the rear-facing camera when the rotational mechanism is at a second pan angle and a second tilt angle;

within any individual one of the stereo image pairs the first pan angle differs from the second pan angle; and within any individual one of the stereo image pairs where the front- and rear-facing cameras are at a non-zero degree tilt angle, the front- and rear-facing cameras have a same tilt angle magnitude, with one of the front- and rear-facing cameras having a positive tilt angle and the other one of the front- and rear-facing cameras having a negative tilt angle.

3. The method of claim 1, further comprising:
using a structure from motion pipeline to generate a three-dimensional model of the room or other environment for which the images are captured; and
displaying the three-dimensional model of the room or other environment.

4. The method of claim 3, wherein the structure from motion pipeline includes a bundle adjustment stage, and wherein the method further comprises specifying constraints for the bundle adjustment stage based on one or more of the following: geometrical configuration information associated with the mobile computing device; internal configuration information associated with the mobile computing device; or geometrical configuration information associated with the rotational mechanism.

5. The method of claim 2, further comprising:
transferring the obtained images and corresponding metadata from the mobile computing device to a remote system that is configured to generate three-dimensional models of rooms or other environments based on images;
receiving, from the remote system, data that enables the mobile computing device to display a three-dimensional model of the room or other environment to a user; and
displaying the three-dimensional model of the room or other environment, the displaying performed using the data received from the remote system;
wherein the selecting step that is repeated a plurality of times to thereby obtain the plurality of stereo image pairs can be performed by mobile computing device, under control of the application installed on and executed by the mobile computing device, or by the remote system to which the obtained images are transferred.

6. The method of claim 5, wherein the metadata corresponding to each of the obtained images comprises one or more of the following:
a pan angle and a tilt angle of the mobile computing device when the image was obtained;
a pan angle and a tilt angle of the rotational mechanism when the image was obtained;
a time that the image was obtained;
accelerometer sensor data when the image was obtained;
magnetometer sensor data when the image was obtained; or
gyroscope sensor data when the image was obtained.

7. The method of claim 6, wherein metadata that is transferred from the mobile computing device to the remote system also includes data that specifies which two obtained images are included in each stereo image pair.

8. The method of claim 1, wherein a plurality of images are captured at each pan angle and tilt angle combination, with each of the images captured at a same pan angle and tilt angle combination captured using a different exposure setting.

9. The method of claim 1, wherein the mobile computing device including the front- and rear-facing cameras and on which the application is installed and executed comprises a smartphone or a tablet computing device, and wherein the controlling the front- and rear-facing cameras and the controlling the rotational mechanism on which the mobile computing device is mounted are performed by the application installed on and executed by the smartphone or tablet computing device.

10. The method of claim 1, wherein the application installed on and executed by the mobile computing device controls the front- and rear-facing cameras of the mobile computing device and controls the rotational mechanism on which the mobile computing device is mounted such that:
multiple images are obtained by each of the front- and rear-facing cameras of the mobile computing device at each of a plurality of different pan angles; and
at each of the plurality of different pan angles, images corresponding to different tilt angles are obtained by each of the front- and rear-facing cameras of the mobile computing device.

11. One or more processor readable storage devices having instructions encoded thereon which when executed cause one or more processors to perform a method for use in obtaining stereo image pairs that can be used for generating a three-dimensional (3D) model of a room or other environment or producing virtual reality (VR) content, wherein the method is for use with a mobile computing device that includes a front-facing camera and a rear-facing camera and is mounted on a rotational mechanism such that the front- and rear-facing cameras of the mobile computing device are each offset from a center of rotation of the rotational mechanism, the method comprising:
controlling the front- and rear-facing cameras of the mobile computing device and controlling the rotational mechanism to capture images of the room or other environment using both the front- and rear-facing cameras at each of a plurality of different pan angle and tilt angle combinations;
selecting, for inclusion in a stereo image pair, a first image of a portion of the room or other environment captured using the front-facing camera and a second image of the portion of the room or other environment captured using the rear-facing camera,
wherein the first and second images of the stereo image pair are captured, respectively, at first and second times that differ from one another; and
repeating the selecting step a plurality of times to thereby obtain a plurality of stereo image pairs that can be used for generating a 3D model of the room or other environment or producing VR content;
wherein the instructions, which when executed cause one or more processors to control the front- and rear-facing cameras of the mobile computing device and control the rotational mechanism, are included within an application installed on and executed by the mobile computing device.

12. The one or more processor readable storage devices of claim 11, wherein:
when selecting the first and second images for inclusion in a said stereo image pair,
the first image, which is selected for inclusion in the stereo image pair, is captured at the first time using the front-facing camera when the rotational mechanism is at a first pan angle and at a first tilt angle, and
the second image, which is selected for inclusion in the stereo image pair, is captured at the second time using the rear-facing camera when the rotational mechanism is at a second pan angle and a second tilt angle;
within any individual one of the stereo image pairs the first pan angle differs from the second pan angle; and
within any individual one of the stereo image pairs where the front- and rear-facing cameras are at a non-zero degree tilt angle, the front- and rear-facing cameras have a same tilt angle magnitude, with one of the frontand rear-facing cameras having a positive tilt angle and the other one of the front- and rear-facing cameras having a negative tilt angle.

13. The one or more processor readable storage devices of claim 11, wherein the method further comprises:
using a structure from motion pipeline to generate a three-dimensional model of the room or other environment for which the images are captured;
wherein the structure from motion pipeline includes a bundle adjustment stage, and wherein the method further comprises specifying constraints for the bundle adjustment stage based on one or more of the following: (a) geometrical configuration information associated with the mobile computing device; (b) internal configuration information associated with the mobile computing device; or (c) geometrical configuration information associated with the rotational mechanism; and
displaying the three-dimensional model of the room or other environment.

14. The one or more processor readable storage devices of claim 11, wherein the method further comprises:
transferring the obtained images and corresponding metadata from the mobile computing device to a remote system that is configured to generate three-dimensional models of rooms or other environments based on images;
receiving, from the remote system, data that enables the mobile computing device to display a three-dimensional model of the room or other environment to a user; and
displaying the three-dimensional model of the room or other environment, the displaying performed using the data received from the remote system.

15. The one or more processor readable storage devices of claim 14, wherein the metadata corresponding to each of the obtained images comprises one or more of the following:
a pan angle and a tilt angle of the mobile computing device when the image was obtained;
a pan angle and a tilt angle of the rotational mechanism when the image was obtained;
a time that the image was obtained;
accelerometer sensor data when the image was obtained;
magnetometer sensor data when the image was obtained; or
gyroscope sensor data when the image was obtained.

16. The one or more processor readable storage devices of claim 15, wherein metadata that is transferred from the mobile computing device to the remote system also includes data that specifies which two obtained images are included in each stereo image pair.

17. A mobile computing device, comprising:
a display;
a front-facing camera;
a rear-facing camera; and
one or more processors configured to
control the cameras of the mobile computing device and control a rotational mechanism to which the mobile computing device is mounted to capture images of a room or other environment using both the front- and rear-facing cameras at each of a plurality of different pan angle and tilt angle combinations, such that images corresponding to different tilt angles are obtained by each of the front- and rear-facing cameras of the mobile computing device at each of a plurality of different pan angles; and
identify a plurality of stereo image pairs by selecting, for inclusion in each of the stereo image pairs, a respective first image of a portion of the room or other environment captured using the front-facing camera and a respective second image of the portion of the room or other environment captured using the rear-facing camera;
wherein the first and second images of each stereo image pair are captured, respectively, at first and second times that differ from one another,
wherein the first image, which is selected for inclusion in the stereo image pair, is captured at the first time using the front-facing camera when the rotational mechanism is at a first pan angle and at a first tilt angle, and
wherein the second image, which is selected for inclusion in the stereo image pair, is captured at the second time using the rear-facing camera when the rotational mechanism is at a second pan angle and a second tilt angle;
wherein within any individual one of the stereo image pairs the first pan angle differs from the second pan angle; and
wherein within any individual one of the stereo image pairs where the front- and rear-facing cameras are at a non-zero degree tilt angle, the front- and rear-facing cameras have a same tilt angle magnitude, with one of the front- and rear-facing cameras having a positive tilt angle and the other one of the front- and rear-facing cameras having a negative tilt angle.

18. The mobile computing device of claim 17, wherein the one or more processors are also configured to:
use the plurality of stereo image pairs to generate a three-dimensional model of the room or other environment for which the images are captured; and
cause the three-dimensional model of the room or other environment to be displayed on the display.

19. The mobile computing device of claim 17, wherein the one or more processors are also configured to:
transfer the obtained images and corresponding metadata from the mobile computing device to a remote system that is configured to generate 3D models of rooms or other environments based on images; and
receive, from the remote system, data that enables the mobile computing device to display a three-dimensional model of the room or other environment to a user.

20. The mobile computing device of claim 19, wherein the one or more processors are also configured to cause the three-dimensional model of the room or other environment to be displayed on the display using the data received from the remote system.

21. The method of claim 1, wherein:
within each stereo image pair of one or more of the plurality of stereo image pairs, the second image of the stereo image pair is captured by the rear-facing camera when a pan angle of the rear-facing camera is offset by 180 degrees from a pan angle of the front-facing camera when the first image of the stereo image pair is captured; and
within each stereo image pair of a further one or more of the plurality of stereo image pairs, the second image of the stereo image pair is captured by the rear-facing camera when a pan angle of the rear-facing camera is offset by an angle other than 180 degrees from a pan angle of the front-facing camera when the first image of the stereo image pair is captured.

* * * * *